US012780696B2

(12) United States Patent
Westlund et al.

(10) Patent No.: US 12,780,696 B2
(45) Date of Patent: Nov. 3, 2026

(54) DEVICES, METHODS, AND COMPOSITIONS FOR TREATING GREASE TRAPS

(71) Applicant: Guard Products, LLC, Madisonville, TN (US)

(72) Inventors: James Westlund, Athens, TN (US); Gary Westlund, Farragut, TN (US); Ger McCloskey, Kyle (IE)

(73) Assignee: Guard Products, LLC, Madisonville, TN (US)

( * ) Notice: Subject to any disclaimer, the term of this patent is extended or adjusted under 35 U.S.C. 154(b) by 311 days.

(21) Appl. No.: 18/662,376

(22) Filed: May 13, 2024

(65) Prior Publication Data

US 2025/0346510 A1 Nov. 13, 2025

(51) Int. Cl.

| | |
|---|---|
| ***B01D 29/05*** | (2006.01) |
| ***B01D 29/96*** | (2006.01) |
| ***C02F 1/00*** | (2023.01) |
| ***C02F 1/68*** | (2023.01) |
| ***C02F 103/32*** | (2006.01) |
| *C02F 101/10* | (2006.01) |

(52) U.S. Cl.

CPC .............. *C02F 1/683* (2013.01); *B01D 29/05* (2013.01); *B01D 29/96* (2013.01); *C02F 1/003* (2013.01); *C02F 2101/101* (2013.01); *C02F 2103/32* (2013.01); *C02F 2303/02* (2013.01); *C02F 2305/04* (2013.01); *C02F 2307/08* (2013.01)

(58) Field of Classification Search

CPC ......... B01D 29/05; B01D 29/96; C02F 1/003; C02F 1/683; C02F 2101/101; C02F 2103/32; C02F 2303/02; C02F 2305/04; C02F 2307/08

See application file for complete search history.

(56) References Cited

U.S. PATENT DOCUMENTS

| | | | | |
|---|---|---|---|---|
| 5,207,921 | A | 5/1993 | Vincent | |
| 6,098,813 | A * | 8/2000 | Cini | B01D 17/10 210/257.2 |
| 6,444,629 | B1 | 9/2002 | Elliott | |
| 6,755,973 | B2 | 6/2004 | Allen | |
| 7,338,602 | B1 | 3/2008 | Parjus | |
| 7,485,230 | B2 | 2/2009 | Magner | |
| 7,931,822 | B2 | 4/2011 | Kelley | |

(Continued)

FOREIGN PATENT DOCUMENTS

| | | | |
|---|---|---|---|
| EP | 3536769 | A1 | 9/2019 |
| WO | 2016005771 | A1 | 1/2016 |
| WO | 2020018891 | A1 | 1/2020 |

*Primary Examiner* — Patrick Orme

(74) *Attorney, Agent, or Firm* — Robinson IP Law, PLLC

(57) ABSTRACT

Various implementations include a screening device for placement in a sink basin. The device includes a first filter frame, a second filter frame, and a filter. The first filter frame includes a first plurality of openings. Each opening of the first plurality of openings has a first opening largest dimension. The first opening largest dimension is 40 mm or less. The second filter frame includes a second plurality of openings. Each opening of the second plurality of openings has a second opening largest dimension. The second opening largest dimension is 40 mm or less. The filter is removably disposed between the first filter frame and the second filter frame. The filter has a grams per square meter (GSM) in the range of 25 GSM to 100 GSM.

37 Claims, 2 Drawing Sheets

(56) References Cited

U.S. PATENT DOCUMENTS

| | | | | |
|---|---|---|---|---|
| 7,985,881 | B2 | 7/2011 | Westlund | |
| 8,337,792 | B2 * | 12/2012 | Westlund ........... | B01D 53/1468 210/511 |
| 9,561,531 | B2 | 2/2017 | Fiorda | |
| 10,603,616 | B1 * | 3/2020 | Nance ................ | B01D 46/0002 |
| 2007/0256982 | A1 | 11/2007 | Kelley | |
| 2011/0142784 | A1 | 6/2011 | Leipold | |
| 2021/0155516 | A1 | 5/2021 | Curtis | |
| 2021/0171865 | A1 | 6/2021 | Pambou | |
| 2022/0340717 | A1 | 10/2022 | Olschewski | |

* cited by examiner

DEVICES, METHODS, AND COMPOSITIONS FOR TREATING GREASE TRAPS

BACKGROUND

Fat, oil, and grease (FOG) is a serious problem in wastewater treatment systems. It causes reduction of system flow, blockages, and sewer back-ups. The EPA estimates that there are 23,000-75,000 Sewer System Overflows (SSO's) every year. "EPA's Report to Congress on combined sewer overflows (CSOs) and sanitary sewer overflows (SSOs) identified that "grease from restaurants, homes, and industrial sources are the most common cause (47%) of reported blockages." These events can cause water quality problems, threaten public health, and cause serious damage to homes and businesses when blockages back-up and overflow.

Consequently, Municipal Water Systems restrict the discharge of FOG directly to the collection systems. Restaurants are required to use and maintain grease traps to mitigate FOG release to the collection system. Keeping the grease traps functioning is of utmost importance to the restaurant as it keeps them in compliance and avoids the damage to business brought on by blockages, overflows, and foul odors.

The grease trap has been a continual problem to maintain for restaurants. Grease traps are recipients of food waste, floor cleaning soaps and waste, dish wash detergents, and more. Grease traps include high levels of elemental sulfur compounds, such as sulfate, which are energy sources for present sulfate or sulfur-reducing bacteria (SRB). During the process of dissimilatory sulfate reduction, the SRB obtain energy by reducing sulfate and then expel the resulting sulfide as a waste product. This naturally occurring process generates extremely offensive odors, which can, in many cases, lead to dangerous or corrosive levels of the acid gas hydrogen sulfide ($H_2S$). Foul odors from a freshly opened internal passive grease trap will quickly envelope the premises and permeate clothing, fabric, hair, and skin of the handler.

Not only do offensive odors such as $H_2S$ deter customers and slow traffic to the store, they also pose a danger to service company personnel servicing the grease trap due to the toxic nature of the $H_2S$ content. The FOG generally creates a hard layer in the grease trap (and larger grease interceptors or WWTP lift stations) which reduces efficiency of the unit and makes it difficult for the service company to clean out (de-sludge). It has been noted that hardened FOG puts great strain on the VAC truck pumps and equipment which can significantly shorten equipment service life.

In the case of food service establishments (FSE's) primarily serving coffee and related beverages, a gelatinous lipid structure forms in the grease trap which produces the same issues of odor and flow. Grease trap units commonly malfunction due to FOG depositing in and around moving parts, heating elements and more. FSE's are primarily concerned with odors and complying with current FOG and drain regulations whereas municipalities/local governing bodies are primarily concerned with preventing FOG from entering the sewer/collections system. However, despite being highly regulated, FOG (emulsified or otherwise) continues to enter sewer systems, grease traps continue to malfunction requiring frequent servicing, and the offensive odors persist.

SUMMARY

Various implementations include a screening device for placement in a sink basin. The device includes a first filter frame, a second filter frame, and a filter. The first filter frame includes a first plurality of openings. Each opening of the first plurality of openings has a first opening largest dimension. The first opening largest dimension is 40 mm or less. The second filter frame includes a second plurality of openings. Each opening of the second plurality of openings has a second opening largest dimension. The second opening largest dimension is 40 mm or less. The filter is removably disposed between the first filter frame and the second filter frame. The filter has a grams per square meter (GSM) in the range of 25 GSM to 100 GSM.

In some implementations, each opening of the first plurality of openings or each opening of the second plurality of openings is a rectangular-shaped opening. In some implementations, each opening of the first plurality of openings or each opening of the second plurality of openings is a square-shaped opening.

In some implementations, the first filter frame or the second filter frame includes a wire grate. In some implementations, the wires at least partially define the first plurality of openings or the second plurality of openings, respectively.

In some implementations, the first filter frame or the second filter frame comprises a rust resistant material. In some implementations, the first filter frame or the second filter frame comprises stainless steel.

In some implementations, each opening of the first opening largest dimension and the second opening largest dimension is 35.5 mm or less. In some implementations, each opening of the first opening largest dimension and the second opening largest dimension is 25 mm or more.

In some implementations, the first filter frame has a first filter frame length and a first filter frame width, the second filter frame has a second filter frame length and a second filter frame width, and the filter has a filter length and a filter width. In some implementations, the filter length is less than the largest of the first filter frame length and the second filter frame length. In some implementations, the filter width is less than the largest of the first filter frame width and the second filter frame width.

In some implementations, the GSM is in the range of 25 GSM to 75 GSM. In some implementations, the GSM is in the range of 40 GSM to 60 GSM.

In some implementations, the device further includes a basket having a floor removably disposable on the first filter frame. In some implementations, the floor defines a plurality of basket openings. In some implementations, each of the basket openings have a basket opening largest dimension. In some implementations, the basket opening largest dimension is smaller than the first opening largest dimension and the second opening largest dimension.

In some implementations, the basket opening largest dimension is in the range of 1.5 mm to 2.5 mm. in some implementations, the basket opening largest dimension is about 2 mm.

In some implementations, each opening of the plurality of basket openings is a circular-shaped opening.

In some implementations, the basket comprises a rust resistant material. In some implementations, the basket comprises stainless steel.

In some implementations, the basket defines one or more handles.

Various other implementations include a system for treating a grease trap. The system includes a reservoir, a pump, and a grease trap. The reservoir defines an inner cavity. The inner cavity contains a composition comprising an aromatic imine. The pump has an input port and an output port. The pump is configured to create a pressure difference between the input port and the output port to cause liquid to flow from the input port to the output port. The inner cavity of the reservoir is in fluid communication with the input port of the pump and the output port of the pump is in fluid communication with the grease trap such that the pump causes the aromatic imine within the inner cavity of the reservoir to flow into the grease trap. In some implementations, the pump comprises a peristaltic pump.

In some implementations, the pump is configured to cause the composition to flow into the grease trap at a flowrate in the range of 20-140 ml/min. in some implementations, the flowrate is about 75-85 ml/min.

In some implementations, the inner cavity of the reservoir has a capacity of 1 liter or more.

In some implementations, the composition further contains a surfactant. In some implementations, the composition further contains water.

In some implementations, the composition contains: from about 25% by weight to about 85% by weight of the aromatic imine, from about 5% by weight to about 25% by weight of the surfactant, and from about 10% by weight to about 50% by weight of the water.

In some implementations, the composition contains: from about 50% by weight to about 70% by weight of the aromatic imine, from about 5% by weight to about 15% by weight of the surfactant, and from about 20% by weight to about 40% by weight of the water.

In some implementations, the composition contains: about 60% by weight of the aromatic imine, about 9% by weight of the surfactant, and about 31% by weight of the water.

In some implementations, the pump is configured to cause to flow a shock dose of composition into the grease trap. In some implementations, the shock dose contains about 0.5% to about 1.5% volume of composition per volume of material in the grease trap being treated. In some implementations, the shock dose contains about 0.25% to about 1.5% volume of composition per volume capacity of the grease trap. In some implementations, the shock dose contains about 0.2% to about 1.5% volume of composition per volume of material in the grease trap being treated.

In some implementations, the pump is configured to cause to flow a maintenance dose of composition into the grease trap. In some implementations, the maintenance dose contains about 0.005% to about 0.01% volume of composition per volume of material in the grease trap being treated. In some implementations, the maintenance dose contains about 0.0025% to about 0.01% of composition per volume capacity of the grease trap. In some implementations, the maintenance dose contains about 0.0025% to about 0.01% of composition per volume of material in the grease trap being treated.

In some implementations, the aromatic imine comprises an aromatic amine formed from one or more combinations of one or more aromatic aldehydes and ketones with primary and tertiary amines. In some implementations, the one or more aromatic aldehydes is a member selected from the group consisting of benzaldehyde, cinnamaldehyde, a vanillin, and combinations thereof. In some implementations, the one or more amines is a member selected from the group consisting of ethanolamine, benzylamine, methyl diethanolamine, diglycolamine, and combinations thereof.

In some implementations, the surfactant is a member selected from the group consisting of amine oxides, lauryl sulfates, laureth sulfates, olefin sulfonates, sulfosuccinates, amphoacetates, sultaines, phosphonates, alkyl betaines, betaines, phosphate esters, sulfonated copolymers, xylene sulfonate salts, enhanced polymaleic salts, salts of acrylic acids, polyaspartic acid salts and sodium or potassium salts of fatty acids, amides, polyethylene glycols, polyglucosides, sorbitan derivatives, ethoxylated alcohols, and combinations thereof.

In some implementations, the composition further comprises an alkaline buffer.

Various other implementations include a system for preventing fat, oil, and grease (FOG) accumulation in a grease trap. The system includes a screening device for placement in a sink basin and a system for treating a grease trap. The screening device for placement in a sink basin includes a first filter frame, a second filter frame, and a filter. The first filter frame includes a first plurality of openings. The second filter frame includes a second plurality of openings. The filter is removably disposed between the first filter frame and the second filter frame. The system for treating a grease trap includes a reservoir, a pump, and a grease trap. The reservoir defines an inner cavity for containing a composition. The pump has an input port and an output port. The pump is configured to create a pressure difference between the input port and the output port to cause liquid to flow from the input port to the output port. The grease trap is in fluid communication with the sink basin. The inner cavity of the reservoir is in fluid communication with the input port of the pump and the output port of the pump is in fluid communication with the grease trap such that the pump causes the aromatic imine within the inner cavity of the reservoir to flow into the grease trap.

In some implementations, each opening of the first plurality of openings has a first opening largest dimension. In some implementations, the first opening largest dimension is 40 mm or less. in some implementations, each opening of the second plurality of openings has a second opening largest dimension. In some implementations, the second opening largest dimension is 40 mm or less. In some implementations, each opening of the first opening largest dimension and the second opening largest dimension is 35.5 mm or less.

In some implementations, each opening of the first opening largest dimension and the second opening largest dimension is 25 mm or more.

In some implementations, the filter has a grams per square meter (GSM) in the range of 25 GSM to 100 GSM. In some implementations, the GSM is in the range of 25 GSM to 75 GSM. In some implementations, the GSM is in the range of 40 GSM to 60 GSM.

In some implementations, each opening of the first plurality of openings or each opening of the second plurality of openings is a rectangular-shaped opening. In some implementations, each opening of the first plurality of openings or each opening of the second plurality of openings is a square-shaped opening.

In some implementations, the first filter frame or the second filter frame includes a wire grate. In some implementations, the wires at least partially define the first plurality of openings or the second plurality of openings, respectively.

In some implementations, the first filter frame or the second filter frame comprises a rust resistant material. In some implementations, the first filter frame or the second filter frame comprises stainless steel.

In some implementations, the first filter frame has a first filter frame length and a first filter frame width, the second filter frame has a second filter frame length and a second filter frame width, and the filter has a filter length and a filter width. in some implementations, the filter length is less than the largest of the first filter frame length and the second filter frame length. In some implementations, the filter width is less than the largest of the first filter frame width and the second filter frame width.

In some implementations, the system further includes a basket having a floor removably disposable on the first filter frame. In some implementations, the floor defines a plurality of basket openings. In some implementations, each of the basket openings have a basket opening largest dimension. In some implementations, the basket opening largest dimension is smaller than the first opening largest dimension and the second opening largest dimension.

In some implementations, the basket opening largest dimension is in the range of 1.5 mm to 2.5 mm. In some implementations, the basket opening largest dimension is about 2 mm.

In some implementations, each opening of the plurality of basket openings is a circular-shaped opening.

In some implementations, the basket comprises a rust resistant material. In some implementations, the basket comprises stainless steel.

In some implementations, the basket defines one or more handles.

In some implementations, the pump comprises a peristaltic pump.

In some implementations, the pump is configured to cause the composition to flow into the grease trap at a flowrate in the range of 20-140 ml/min. In some implementations, the flowrate is about 75-85 ml/min.

In some implementations, the inner cavity of the reservoir has a capacity of 1 liter or more.

In some implementations, the inner cavity contains the composition. In some implementations, the composition comprises an aromatic imine. In some implementations, the composition further contains a surfactant. In some implementations, the composition further contains water.

In some implementations, the composition contains: from about 25% by weight to about 85% by weight of the aromatic imine, from about 5% by weight to about 25% by weight of the surfactant, and from about 10% by weight to about 50% by weight of the water.

In some implementations, the composition contains: from about 50% by weight to about 70% by weight of the aromatic imine, from about 5% by weight to about 15% by weight of the surfactant, and from about 20% by weight to about 40% by weight of the water.

In some implementations, the composition contains: about 60% by weight of the aromatic imine, about 9% by weight of the surfactant, and about 31% by weight of the water.

In some implementations, the pump is configured to cause to flow a shock dose of composition into the grease trap. In some implementations, the shock dose contains about 0.5% to about 1.5% volume of composition per volume of material in the grease trap being treated. In some implementations, the shock dose contains about 0.25% to about 1.5% volume of composition per volume capacity of the grease trap. In some implementations, the shock dose contains about 0.2% to about 1.5% volume of composition per volume of material in the grease trap being treated.

In some implementations, the pump is configured to cause to flow a maintenance dose of composition into the grease trap. In some implementations, the maintenance dose contains about 0.005% to about 0.01% volume of composition per volume of material in the grease trap being treated. In some implementations, the maintenance dose contains about 0.0025% to about 0.01% of composition per volume capacity of the grease trap. In some implementations, the maintenance dose contains about 0.0025% to about 0.01% of composition per volume of material in the grease trap being treated.

In some implementations, the aromatic imine comprises an aromatic amine formed from one or more combinations of one or more aromatic aldehydes and ketones with primary and tertiary amines. In some implementations, the one or more aromatic aldehydes is a member selected from the group consisting of benzaldehyde, cinnamaldehyde, a vanillin, and combinations thereof. In some implementations, the one or more amines is a member selected from the group consisting of ethanolamine, benzylamine, methyl diethanolamine, diglycolamine, and combinations thereof.

In some implementations, the surfactant is a member selected from the group consisting of amine oxides, lauryl sulfates, laureth sulfates, olefin sulfonates, sulfosuccinates, amphoacetates, sultaines, phosphonates, alkyl betaines, betaines, phosphate esters, sulfonated copolymers, xylene sulfonate salts, enhanced polymaleic salts, salts of acrylic acids, polyaspartic acid salts and sodium or potassium salts of fatty acids, amides, polyethylene glycols, polyglucosides, sorbitan derivatives, ethoxylated alcohols, and combinations thereof. In some implementations, the composition further comprises an alkaline buffer.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

Figure 1:
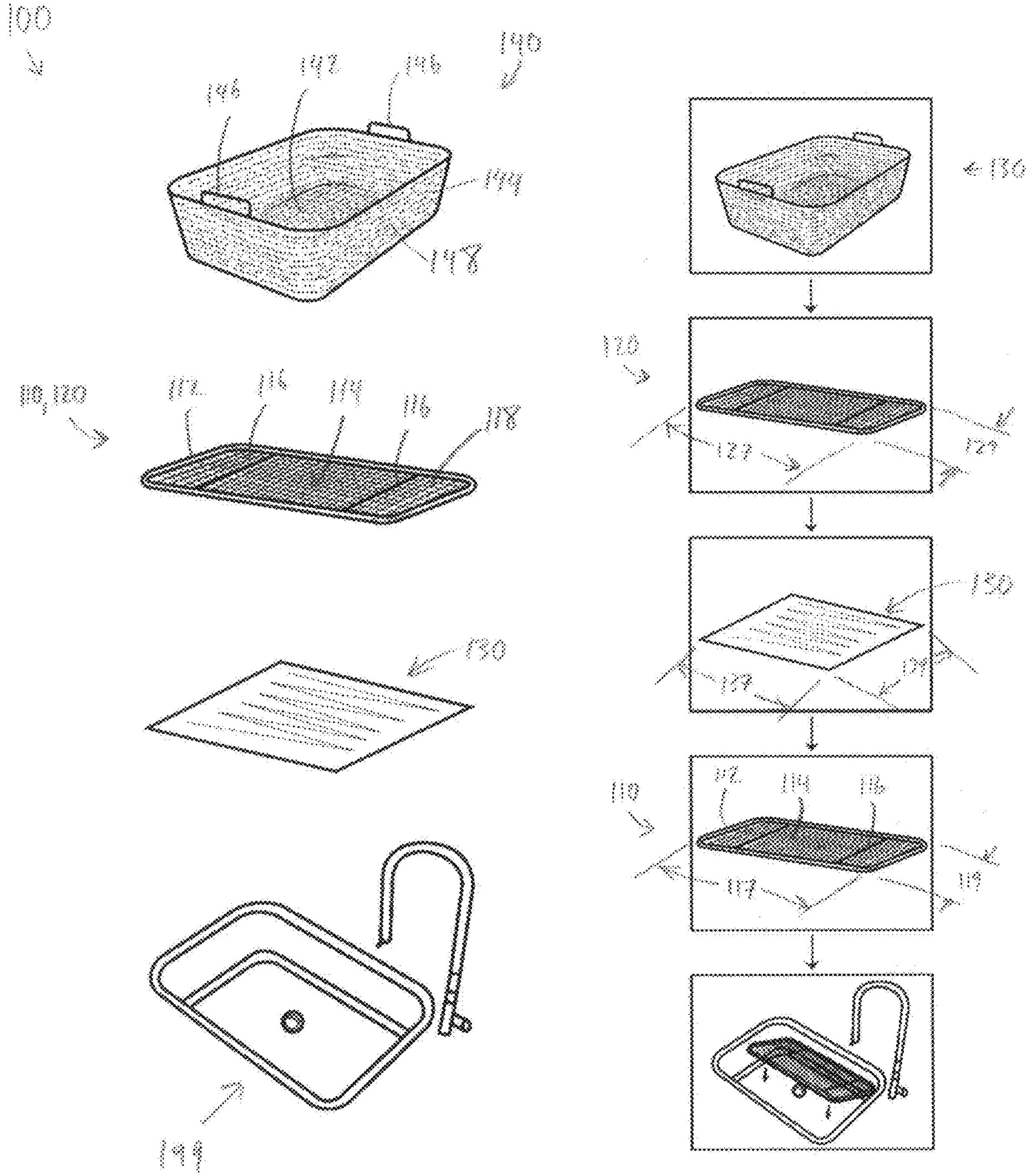
FIG. 1 is a flow chart showing a screening device being placed in a sink basin, according to one implementation.

The devices, systems, methods, and compositions disclosed herein provide for non-regulated compositions of cleaning compounds used alone or in conjunction with novel food filtering screens to improve the function of various commercial grease trap units, grease interceptors, wastewater holding, processing, collections systems, and drains. The devices, systems, methods, and compositions disclosed herein can be used to reduce maintenance costs and mitigate or eliminate the recurring issues associated with foul odors, grease trap unit dysfunction and frequent servicing (desludging). The devices, systems, methods, and compositions disclosed herein also enhance the naturally occurring microbial removal of contaminants, promotes the beneficial refining and separation of oil, general internal substrate cleanliness, modification of the FOG and sludge rheology, demulsification and clarification of the wastewater system (mid-water), reduction of pollutant compounds, and the breakdown of bound organics.

The devices, systems, methods, and compositions disclosed herein have been developed to primarily eliminate the problem of odor and grease trap unit malfunction by beneficially softening and conditioning the upper FOG structural component. It has been discovered that the aromatic imines not only control odors but also modify the FOG rheology. With dairy-related solids, the aromatic imine is similarly able to soften and liquify the structure into a top-phase tight layer and eliminate all odors within minutes. It is surmised that the ability of the imine reactant to bind and remove sulfur compounds beneficially alters the structure of the FOG and related gelatinous waste solids structures.

Aromatic imines and enamines derived from an aromatic aldehyde(s) and various primary and tertiary amines. These compounds demonstrate solubility in both water and lipophilic solutions. The most important functions are the control of sulfur-based odorous compounds, such as $H_2S$ and mercaptans, and the modification of the FOG structure. The aromatic imine targets, reacts with and complexes the source odorous compound as opposed to a fragrance which attempts to cover up or mask the odor. Scavenging the sulfur content of FOG leads to the rheology modification of FOG and subsequently forming a loosely bound compound which demonstrates improved ease of removal (de-sludging) as well as access for microbial activity. This is confirmed by initial increased BOD levels upon treatment.

The composition performance is enhanced with the addition of a screening device in the rinse sink which captures the majority of food particles and scraps. Without the screening device, high levels of food scraps and fats pass through the drain and enter the grease trap which ultimately can encourage unit malfunction as well as FOG subsequently entering the sewer system. The screening devices and systems disclosed herein allow for lower consumption rates of the compositions disclosed herein due to the reduced degree of solids loading and FOG amalgamation within the grease trap. This also extends the cycle time between discretional de-sludging clean-outs and has great implications for significantly lowering operating and treatment costs.

The screening devices and systems disclosed herein can cut the food waste entering the grease trap by 70-100%. In turn, lab testing has verified that eliminating the food waste solids has the effect to reduce BOD by 50%, COD by 15% and TSS by 50%. As many grease trap units have moving parts including pipe, switches, augers, pumps, valves etc., eliminating these food waste solids improves efficiency dramatically and lowers the overall treatment cost and extends cycle time of clean-out for the grease trap. Further, the screening devices and systems disclosed herein perform without reducing water flow down the drain.

The screening devices and systems disclosed herein include a filtration system that was designed to improve the quality of wastewater effluent by lowering its constituent pollutant and organic content through the removal of food waste particles, emulsified oils, starches, and other pollutants in the sink prior to their entering a drain and subsequent waste system segment such as the grease trap or grease retention unit. Currently, there is no comparable system in existence.

The screening devices and systems disclosed herein can include three components: an in-sink basket, filter frames, and infra filters.

The in-sink basket can filter large particles of food waste that ends up in the sink from kitchen ware, utensils, pots, pans, and more. It can be manufactured from 304 perforated stainless steel (or heat and chemical resistant polymer composites) with 2 mm holes and can be fabricated to fit snugly into the sink to maximize performance. It can include handles that are ergonomically designed to maximize sink operations. Holes less than 2 mm generally plug up and require cleaning while holes which are larger allow undesirable small food particles to pass through.

The filter frames can be the 304 stainless steel filter frames (or heat and chemical resistant polymer composites) and can be used to hold the filters in place-one above and one below the in-sink basket. They are designed to ensure the operator places them accurately to cover the entire surface area. The mesh size can be 25 mm, which allows for case of removal.

The infra filters are designed to remove finer particles of food waste that infiltrate/pass through the basket holes. The infra filters can be made of permeable fabric so that they can capture 99% of food waste, emulsified oils, and starches. Filters can be of various gram/square/meter (25-240) weight depending on the effluent to be treated such as oil, fat, grease, flour, rice water, potatoes, (starches) etc. The infra filters can be made of synthetic recycled, full synthetic with extra absorbency, natural fiber, or any other filtering material. The natural fiber material sheet/filter can be made of (but not limited to) lactic acid-based materials, cotton wools, kapok, banana, pineapple fibers. Dependent upon sheet selection, a compostable, bio-degradable disposable product is attainable.

The aromatic imines can be formed from combinations of aromatic aldehydes and ketones with primary and tertiary amines. For examples, in particular implementations, the aromatic aldehyde is selected from but not limited to benzaldehyde, cinnamaldehyde, and a vanillin. Most preferred is benzaldehyde. In particular implementations, the amine or amine derivative is selected from but not limited to ethanolamine, benzylamine, methyl diethanolamine, and diglycolamine. Most preferred is ethanolamine. Imines derived from the various aromatic aldehydes also have the benefit to allow for the choice of residual aroma attributes such as cherry, cinnamon, vanilla, etc. or combinations thereof. The aromatic imine compounds of this invention have very low vapor pressure and are also readily biodegradable.

The addition of surfactants in some implementations aid in optimizing solubility of the aromatic imine in this application. These are selected from non-ionic, anionic and amphoteric surfactants. and combinations thereof. Examples being, but not limited to, amine oxides, lauryl sulfates, laureth sulfates, olefin sulfonates, sulfosuccinates, amphoacetates, sultaines, phosphonates, alkyl betaines, betaines, phosphate esters, sulfonated copolymers, xylene sulfonate salts, enhanced polymaleic salts, salts of acrylic acids, polyaspartic acid salts and sodium or potassium salts of fatty acids, amides, polyethylene glycols, polyglucosides, sorbitan derivatives, and ethoxylated alcohols.

In some implementations, the composition can contain 25-85% of the aromatic imine, 5-25% of the surfactant, and 10-50% water by weight. The most preferred composition contains 60% of the aromatic imine, 9% of a polyethylene glycol surfactant, and 31% water by weight. In some implementations, the single "shock dose" treatment in the application of the compositions disclosed here can be 0.25-1.5% of volume in the grease trap. In some implementations, automatic daily metered treatment in application of this composition can be 0.0025-0.01% in the grease trap.

Further, while experimenting with adjusting FOG wastewater pH in order to enhance microbial activity as well as bringing the system to or towards neutral, it has been discovered that nominal addition of an alkaline buffer (such as sodium carbonate) to the aromatic imine treated grease trap significantly accelerates the performance of the invention.

In some implementations, the aromatic imine with combinations of dispersant surfactants can be used as a hard surface deodorizing cleaner for hard surface and floor cleaning applications. This offers benefits to the grease trap unit, not only by the cleaning and demulsifying properties of the product enhanced by the aromatic imine, but also by replacing cleaning solutions which can introduce emulsifying effects on wastewaters. Further to this, initial use on dirty and slippery FSE floors showed a two to three times improvement in slip-resistance. Examples being, but not limited to, amine oxides, lauryl sulfates, laureth sulfates, olefin sulfonates, sulfosuccinates, amphoacetates, sultaines, phosphonates, alkyl betaines, betaines, phosphate esters, alkane sulfonates, sulfonated copolymers, xylene sulfonate salts, enhanced polymalcic salts, polyaspartic acid salts and sodium or potassium salts of fatty acids, amides, polyethylene glycols, polyglucosides, sorbitan derivatives, ethoxylated alcohols.

In some implementations, the composition can contain 1-10% of the aromatic imine, 5-25% of alkyl betaine, 5-25% of amine oxide, 10-40% of laureth sulfate, and 50-95% water by weight. A preferred composition contains 2% of the aromatic imine, 6% of alkyl betaine, 6% of amine oxide, 12% of laureth sulfate, and 74% water by weight. The typical treatment in trial application of this composition has been 1-10% of volume in the cleaning water.

Various implementations include a screening device for placement in a sink basin. The device includes a first filter frame, a second filter frame, and a filter. The first filter frame includes a first plurality of openings. Each opening of the first plurality of openings has a first opening largest dimension. The first opening largest dimension is 40 mm or less. The second filter frame includes a second plurality of openings. Each opening of the second plurality of openings has a second opening largest dimension. The second opening largest dimension is 40 mm or less. The filter is removably disposed between the first filter frame and the second filter frame. The filter has a grams per square meter (GSM) in the range of 25 GSM to 100 GSM.

Various other implementations include a system for treating a grease trap. The system includes a reservoir, a pump, and a grease trap. The reservoir defines an inner cavity. The inner cavity contains a composition comprising an aromatic imine. The pump has an input port and an output port. The pump is configured to create a pressure difference between the input port and the output port to cause liquid to flow from the input port to the output port. The inner cavity of the reservoir is in fluid communication with the input port of the pump and the output port of the pump is in fluid communication with the grease trap such that the pump causes the aromatic imine within the inner cavity of the reservoir to flow into the grease trap.

Various other implementations include a system for preventing fat, oil, and grease (FOG) accumulation in a grease trap. The system includes a screening device for placement in a sink basin and a system for treating a grease trap. The screening device for placement in a sink basin includes a first filter frame, a second filter frame, and a filter. The first filter frame includes a first plurality of openings. The second filter frame includes a second plurality of openings. The filter is removably disposed between the first filter frame and the second filter frame. The system for treating a grease trap includes a reservoir, a pump, and a grease trap. The reservoir defines an inner cavity for containing a composition. The pump has an input port and an output port. The pump is configured to create a pressure difference between the input port and the output port to cause liquid to flow from the input port to the output port. The grease trap is in fluid communication with the sink basin. The inner cavity of the reservoir is in fluid communication with the input port of the pump and the output port of the pump is in fluid communication with the grease trap such that the pump causes the aromatic imine within the inner cavity of the reservoir to flow into the grease trap.

FIG. 1 shows a screening device for placement in a sink basin 100, according to one implementation. The screening device 100 includes a first filter frame 110, a second filter frame 120, a filter 130, and a basket 140.

The first filter frame 110 and the second filter frame 120 each include an outer frame 112 that provides structural stability to the other components of the first filter frame 110 or second filter frame 120. Each filter frame 110 includes a wire grate 114 that extends between sides of the outer frame 112.

The first filter frame 110 and the second filter frame 110 can also include one or more structural supports 116 extending from one edge of the outer frame 112 to another edge of the outer frame 112 to support the wire grate 114.

Each of the outer frame 112, the wire grate 114, and the structural supports 116 of the first filter framer 110 and the second filter frame 120 shown in FIG. 1 are made of 304 stainless steel, but in some implementations, the outer frame, the wire grate, and/or the structural supports of the first filter framer or the second filter frame can be made of a polymer, aluminum, or any other rust resistant material.

The wires of the wire grates 114 at least partially define a plurality of square openings 118, but in some implementations, the openings can be rectangular, circular, ovate, triangular, pentagonal, hexagonal, or any other closed shape.

Each opening of the plurality of openings 118 of the first filter frame 110 and the second filter frame 120 has an opening largest dimension. For square openings, this dimension is measured from one side of the opening to the opposite side of the opening. For a rectangle, the opening largest dimension is measured from one side of the opening across the length to the opposite side of the opening. For a circular opening, the opening largest dimension is a diameter. The opening largest dimension of the openings 118 shown in FIG. 1 is 25 mm. However, in some implementations, the opening largest dimension is 25 mm or more. In some implementations, the opening largest dimension is 40 mm or less.

The filter 130 is removably disposed between the first filter frame 110 and the second filter frame 120. The filter frames 110, 120 are designed to apply pressure to the filter 130 to prevent the filter 130 from moving during use.

The filter 130 shown in FIG. 1 has a grams per square meter (GSM) in the range of 40 GSM to 60 GSM. However, in some implementations, the GSM is in the range of 25 GSM to 100 GSM. In some implementations, the GSM is in the range of 25 GSM to 75 GSM.

The filter 130 can be made of synthetic recycled, full synthetic with extra absorbency, natural fiber, or any other filtering material. The natural fiber material of the filter 130 can be made of, but is not limited to, lactic acid-based materials, cotton wools, kapok, banana, pineapple fibers. Dependent upon the material of the filter 130, the filter 130 can be a compostable or bio-degradable disposable.

The first filter frame 110 has a first filter frame length 117 and a first filter frame width 119, and the second filter frame 120 has a second filter frame length 127 and a second filter frame width 129. The filter 130 has a filter length 137 and a filter width 139. The filter length 137 can be configured to be less than the largest of the first filter frame length 117 and the second filter frame length 127, and the filter width 139 can be configured to be less than the largest of the first filter frame width 119 and the second filter frame width 129. This ensures that the filter frames 110, 120 are larger than the filter 130 such that, when the device 100 is used, the filter 130 fits completely between the two filter frames 110, 120.

The basket 140 has a floor 142 for being removably disposable on the top filter frame 120 and a wall 144 extending from the perimetrical edge of the floor 142. The wall 144 of the basket 140 include handles 146 that extend from the wall 144 of the basket 140 configured to allow a user to grasp the basket 140 by the handles 146 during inserting, removing, or adjusting the basket 140 in the sink basin 199. However, in some implementations, the wall of the basket defines one or more handle openings.

The floor 142 of the basket 140, and in some implementations the wall 144, defines a plurality of basket openings 148. The basket openings 148 shown in FIG. 1 are a plurality of circular openings, but in some implementations, the openings can be square, rectangular, ovate, triangular, pentagonal, hexagonal, or any other closed shape.

The basket openings 148 have an opening largest dimension. For circular basket openings 148 as shown in FIG. 1, the opening largest dimension is a diameter. For square openings, this dimension is measured from one side of the opening to the opposite side of the opening. For a rectangle, the opening largest dimension is measured from one side of the opening across the length to the opposite side of the opening.

The basket opening largest dimension shown in FIG. 1 is smaller than the opening largest dimension of the first filter frame 110 and the second filter frame 120. The basket opening largest dimension shown in FIG. 1 is 2 mm. Basket opening largest dimensions less than 2 mm can become obstructed in circumstances where food particles are relatively larger, which requires cleaning of the basket 140. In contrast, the basket opening largest dimensions which are larger than 2 mm can allow undesirable small food particles to pass through the basket openings 148. Thus, while it has been found that 2 mm basket openings 148 are a good compromise for catching large food particles without being obstructed, in some implementations, the basket opening largest dimension can be larger or smaller based on the circumstances of the sink into which it is intended to be placed and the food particles that are intended to be filtered.

Although the basket opening largest dimension shown in FIG. 1 is 2 mm, in some implementations, the basket opening largest dimension is in the range of 1.5 mm to 2.5 mm.

The floor 142 and the wall 144 of the basket 140 shown in FIG. 1 are made of 304 stainless steel, but in some implementations, the floor and the wall of the basket can be made of a polymer, aluminum, or any other rust resistant material.

As shown in FIG. 1, the screening device 100 can be assembled within a sink basin 199. A first filter frame 110 is placed within the sink basin 199. The filter 130 is then placed on the first filter frame 110. A second filter frame 120 is then placed on the filter 130 such that the filter 130 is compressed and contained within the edges of the frames 110, 120. A basket 140 can then be placed on the second filter frame 120, further compressing the filter 130 between the filter frames 110, 120.

Figure 2:
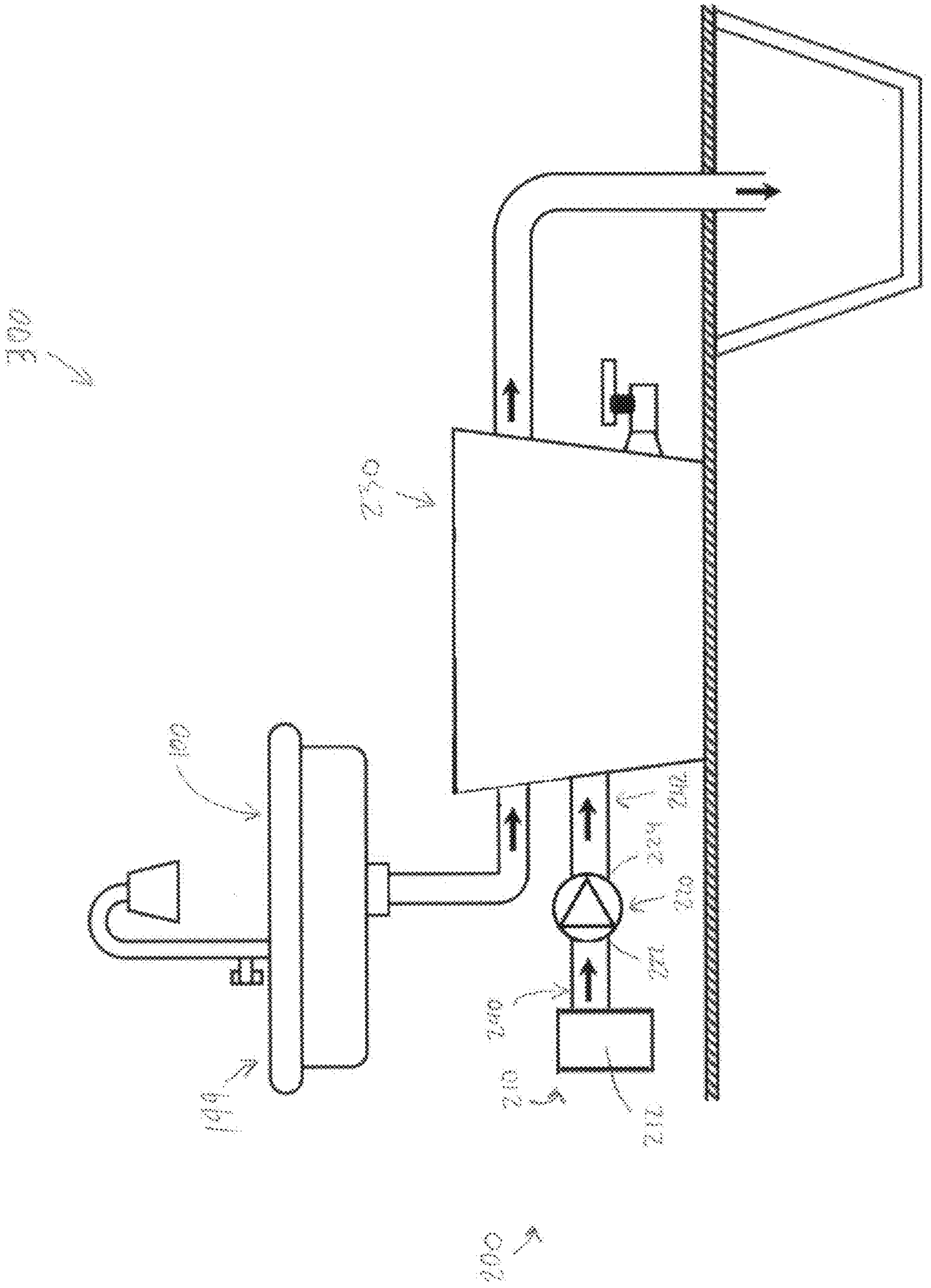
FIG. 2 is a side view of a system for treating a grease trap, according to another implementation.

FIG. 2 shows a system for treating a grease trap 200, according to another implementation. The system 200 includes a reservoir 210, a pump 220, and a grease trap 230.

The reservoir 210 is a container defining an inner cavity 212. The inner cavity 212 of the reservoir 210 shown in FIG. 2 has a capacity of 1 liter. However, in some implementations, the inner cavity of the reservoir has a capacity of less than 1 liter or more than 1 liter. The reservoir 210 can include an input port for adding a composition for treating the grease trap 230 into the inner cavity 212. The input port can include a cap for closing the inner cavity 212 of the reservoir 210.

The pump 220 has an input port 222 and an output port 224. The input port 222 of the pump 220 is in fluid communication with the inner cavity 212 of the reservoir 210 by a first conduit 240. The output port 224 of the pump 220 is in fluid communication with a trap port 232 of the grease trap 230 by a second conduit 242. The pump 220 is configured to create a pressure difference between the input port 222 and the output port 224 to cause liquid to flow from the inner cavity 212 of the reservoir 210, through the first conduit 240, through the input port 222 of the pump 220, through the output port 224 of the pump 220, through the second conduit 242, and into the grease trap 230.

The pump 220 shown in FIG. 2 is a has a peristaltic pump, but in some implementations, the pump can be any type of pump capable of causing liquid to flow from the inner cavity of the reservoir, through the first conduit, through the input port of the pump, through the output port of the pump, through the second conduit, and into the grease trap. The pump can be battery powered or externally powered.

The pump 220 shown in FIG. 2 is configured to cause the composition to flow into the grease trap 230 at a flowrate in the range of 75-85 ml/min. However, in some implementations, the pump is configured to have a flowrate in the range of 20-140 ml/min. in some implementations, the pump is capable of causing the composition to flow into the grease trap in in a volume between 0-350 ml per dose.

The pump 220 shown in FIG. 2 is configured to provide a shock dose of the composition to the grease trap 230 or a maintenance dose of the composition to the grease trap 230. In some implementations, the shock dose is a single-time dose for heavy FOG build-up. In some implementations, the pump is configured to automatically provide to the grease trap a maintenance dose. In some implementations, the maintenance dose is provided to the grease trap based on a predetermined schedule or a timer.

The shock dose of composition into the grease trap 230 for the pump 220 shown in FIG. 2 is configured to contain about 0.25% to about 1.5% volume of composition per volume capacity or of volume material in the grease trap being treated. The maintenance dose of composition into the grease trap 230 for the pump 220 shown in FIG. 2 is configured to contain about 0.0025% to about 0.01% volume of composition per volume capacity or of volume material in the grease trap 230 being treated.

In some implementations, a shock dose, a maintenance dose, or both can be manually added to the grease trap. In some implementations, the system does not include a pump and the composition can be added manually.

The composition within the reservoir 210 includes an aromatic imine, such as those disclosed in U.S. Pat. No. 8,337,792, the contents of which are incorporated by reference herein in its entirety. The composition can further include a surfactant and water. For example, the composition shown in FIG. 2 includes about 60% by weight of the aromatic imine, about 9% by weight of the surfactant, and about 31% by weight of the water. In some implementations, the composition can further include an alkaline buffer.

However, in some implementations, the composition includes from about 50% by weight to about 70% by weight of the aromatic imine. In some implementations, the composition includes from about from about 25% by weight to about 85% by weight of the aromatic imine. For example, the composition can include about 25% by weight, 30% by weight, 35% by weight, 40% by weight, 45% by weight, 50% by weight, 55% by weight, 60% by weight, 65% by weight, 70% by weight, 75% by weight, 80% by weight, or 85% by weight of the aromatic imine.

In some implementations, the aromatic imine can include an aromatic amine formed from one or more combinations of one or more aromatic aldehydes and ketones with primary and tertiary amines. In some implementations, the one or more aromatic aldehydes can be a member selected from the group consisting of benzaldehyde, cinnamaldehyde, a vanillin, and combinations thereof. In some implementations, the one or more amines can be a member selected from the group consisting of ethanolamine, benzylamine, methyl diethanolamine, diglycolamine, and combinations thereof.

In some implementations, the composition includes from about 5% by weight to about 15% by weight of the surfactant. In some implementations, from about 5% by weight to about 25% by weight of the surfactant. For example, the composition can include about 5% by weight, 10% by weight, 15% by weight, 20% by weight, or 25% by weight of the surfactant.

In some implementations, the surfactant is a member selected from the group consisting of amine oxides, lauryl sulfates, laureth sulfates, olefin sulfonates, sulfosuccinates, amphoacetates, sultaines, phosphonates, alkyl betaines, betaines, phosphate esters, sulfonated copolymers, xylene sulfonate salts, enhanced polymaleic salts, salts of acrylic acids, polyaspartic acid salts and sodium or potassium salts of fatty acids, amides, polyethylene glycols, polyglucosides, sorbitan derivatives, ethoxylated alcohols, and combinations thereof.

In some implementations, the composition includes from about 20% by weight to about 40% by weight of the water. In some implementations, the composition includes from about 10% by weight to about 50% by weight of the water. For example, the composition can include about 10% by weight, 15% by weight, 20% by weight, 25% by weight, 30% by weight, 35% by weight, or 40% by weight of the water.

Various other implementations include a system 300 for preventing fat, oil, and grease (FOG) accumulation in a grease trap. The system 300 includes a screening device 100 for placement in a sink basin 199 disclosed herein and a system 200 for treating a grease trap 230 disclosed herein. The screening device 100 and the system 200 can be used on a sink basin 199 that is fluidically coupled to a grease trap 230. As discussed above, the screening device 100 for placement in a sink basin 197 prevents food particles from entering the drain leading to the grease trap 230. Any FOG that passes through the screening device 100 for placement in a sink basin 197 enters the grease trap 230. The system 200 for treating a grease trap 230 can add a composition, such as those disclosed herein, to the grease trap 230 to modify the FOG rheology, softening and liquifying the structure.

The screening device 100 for placement in a sink basin 199 can prevent high levels of food scraps and fats from passing through the drain and entering the grease trap 230, which ultimately can encourage unit malfunction as well as FOG subsequently entering the sewer system. As discussed above, the screening device 100 for placement in a sink basin 199 allows for lower consumption rates of the compositions disclosed herein that are applied to the grease trap 230 by the system 200 for treating a grease trap 230 due to the reduced degree of solids loading and FOG amalgamation within the grease trap 230. This also extends the cycle time between de-sludging clean-outs and has great implications for significantly lowering operating and treatment costs. Thus, use of the screening device 100 for placement in a sink basin 197 in combination with the system 200 for treating a grease trap 230 has a synergistic effect of preventing the build up of food particles and FOG from clogging a grease trap 230.

EXAMPLES

A composition including about 60% by weight of the aromatic imine, about 9% by weight of the surfactant, and about 31% by weight of the water was used in a system for preventing fat, oil, and grease (FOG) accumulation in a grease trap, which included a screening device for placement in a sink basin disclosed herein and a system for treating a grease trap disclosed herein.

The system was used in a restaurant with a fouled grease trap containing 13 gallons of wastewater and FOG. Ongoing problems associated with the grease trap were severe odor issues, pipe blockages and unit malfunction including moving parts sticking due to accumulated FOG and food particles from pasta, rice water, eggs, etc., the de-sludging valve which is critical to daily operation was fouling due to viscous and hardened sludge which failed to decant from the unit into the sludge collection tray, and the oil ball was sticking in the chute. The restaurant had previously attempted to mitigate the issue by having the restaurant staff clean the unit daily, applying bleach to subdue odors, and regularly hiring a service company to resolve the issues.

The system was used to introduce a shock treatment dose of 1 quart of the composition to the grease trap unit. Twenty minutes after the shock treatment dose was added to the grease trap, the kitchen staff noted an elimination of the odor along with a persisting pleasant aroma.

The system continued to be tested on the sink and grease trap and it was found that the sink and grease trap remained odorless while exhibiting dramatic improvements to the cleanliness of all sink and grease trap substrates and moving parts contacted by the internal treated wastewater.

After testing the system, it was found that there was a greater quality and quantity of oil separation and recovery from the treated FOG structure. Furthermore, the thick, clumpy, and sticky FOG amalgam was transformed into a well-defined, thinner and flowable top-layer. The bottom sludge layer was also similarly converted from a slimy and gelatinous formation into a refined, tightened and malleable form. The sludge valve also began working as designed and sludge was decanted easily.

In another example, the system was implemented in a coffee house/restaurant with an average of 650 customers per day with a fouled grease trap containing 12 gallons of wastewater and primarily dairy sludge blockage. The grease trap in the coffee house/restaurant was found to have severe odor issues, pipe blockages and unit malfunction including moving parts sticking due to accumulated dairy sludge/dairy related FOG, a de-sludging valve which is critical to daily operation that was fouling due to viscous and hardened sludge which failed to decant from the unit into the sludge collection tray, and an oil ball that was sticking in the chute.

The coffee house/restaurant had previously attempted to fix these issues by daily cleaning by restaurant staff and hiring cleaning service company. However, these efforts did not resolve the issues.

To implement the system, the grease trap was first emptied and de-sludged, and a screening device for placement in a sink basin filtration system was installed in the sink.

Aromatic imine was applied daily at about 1 fl. oz. via an automatic dosing pump at a set daily time to provide 12 hours of contact and retention.

The sink and grease trap of the coffee house/restaurant were reviewed for one month after the system was implemented. In the review, it was found that the odor immediately removed upon treatment commencement, the water was clean with organics gone and very little debris, oil was passing through the grease trap well, the canister intended to retain good oil was half full of bright and well-defined oil, and the de-sludge valve(s) had begun working as designed.

The fatty amalgamation was found to have changed in the following ways after the system had been implemented for a month: there was a greater quality and quantity of oil separation and recovery from the treated dairy solids structure, there was a transformation of thick, clumpy, and sticky dairy waste amalgam into a well-defined, thinner and flowable top-layer, the bottom sludge layer was similarly converted from a slimy and gelatinous formation into a refined, tightened, and malleable form, and the sludge valve began working as designed and sludge was decanted easily.

After testing the system, it was found that there was a greater quality and quantity of oil separation and recovery from the treated FOG structure. Furthermore, the thick, clumpy, and sticky FOG amalgam was transformed into a well-defined, thinner and flowable top-layer. The bottom sludge layer was also similarly converted from a slimy and gelatinous formation into a refined, tightened and malleable form. The sludge valve also began working as designed and sludge was decanted easily.

In yet another example, the system was implemented in a hotel restaurant that served multi-ethnic food. The restaurant had three fouled grease trap units that had been removed and treated. The sink and grease trap of the restaurant initially smelled foul, the grease trap was badly clogged with FOG deposits and was not functioning properly, has a heating element encrusted with more than 1 inch of deposited and hardened FOG shell from overheating for extended periods of time, and was experiencing by-passing of FOG into the drain/sewer.

To implement the system, the grease trap was given a shock dose of aromatic imine, after which the units looked, smelled, and functioned as new.

Table 1, shown below, shows independent laboratory wastewater contaminant midwater analysis from FOG, midwater, and solids/sludge taken from a full 225-gallon community kitchen interceptor serving 350 meals a day. Extraction of waste materials occurred just prior to a de-sludging service. A system for treating a grease trap disclosed herein was used in the analysis.

TABLE 1

| ANALYTE | NEGATIVE CONTROL T = 0 Hr. VALUE | AROMATIC IMINE 0.65% V/V T = 18 Hr. VALUE | AROMATIC IMINE 0.65% V/V T = 72 Hr. VALUE |
|---|---|---|---|
| FOG (Moisture Content, %) | 16.46 | 25.8 | 28.8 |
| Solid/Sludge (Total Solid, %) | 4.7 | 7.2 | 8.8 |
| SS (mg/L) | 5680 ± 45 | 3545 ± 18 | 1520 ± 12 |
| $NH_4$ (mg/L) | 17.7 ± 0.13 | 14.75 ± 0.05 | 8.35 ± 0.13 |
| $NO_2$ (mg/L) | 1.33 ± 0.09 | 0.33 ± 0.07 | 0.03 ± 0.000 |
| $NO_3$ (mg/L) | <0.01 | <0.01 | <0.01 |
| TP (mg/L) | 2.89 ± 0.08 | 1.32 ± 0.12 | 0.56 ± 0.03 |
| BOD (mg/L) | >9156 | 8517 ± 34 | 8832 ± 39 |

TABLE 1-continued

| ANALYTE | NEGATIVE CONTROL T = 0 Hr. VALUE | AROMATIC IMINE 0.65% V/V T = 18 Hr. VALUE | AROMATIC IMINE 0.65% V/V T = 72 Hr. VALUE |
|---|---|---|---|
| COD (mg/L) | 44700 | 18840 ± 138 | 17090 ± 901 |
| pH | 5.63 ± 0.05 | 5.44 ± 0.05 | 4.71 ± 0.06 |
| Odor Observed | Severe | Absent | Absent |

Table 2, shown below, shows an independent laboratory contaminant analysis for homogenized FOG extracted from a grease trap. Various systems and devices disclosed herein, including a system for preventing fat, oil, and grease (FOG) accumulation in a grease trap, which included a screening device for placement in a sink basin, were used during the analysis.

TABLE 2

| ANALYTE | A) NEGATIVE CONTROL | B) SINK SCREEN ™ | B) AROMATICIMINE 1% V/V |
|---|---|---|---|
| COD | 41200 | 34100 | 40600 |
| cBOD | 10400 | 4650 | 8070 |
| pH | 5.67 | 5.69 | 7.74 |
| Total Suspended Solids | 15460 | 8550 | 7820 |
| Nitrite | 7.7 | 5.8 | 7.6 |
| Total P | 81 | 67.5 | 66 |
| Ortho P | 61 | 55 | 52 |

Table 3, shown below, shows another independent laboratory contaminant analysis for homogenized FOG extracted from a grease trap. Various systems and devices disclosed herein, including a system for preventing fat, oil, and grease (FOG) accumulation in a grease trap, which included a screening device for placement in a sink basin, were used during the analysis.

TABLE 3

| ANALYTE | A) NEGATIVE CONTROL | B) SINK SCREEN ™ + Aromatic Imine 1% V/V |
|---|---|---|
| COD | 35100 | 33100 |
| pH | 5.79 | 8.75 |
| Total Suspended Solids | 14240 | 4230 |
| Ammonia | 497.5 | 377.5 |
| Nitrite | 5.925 | 5.55 |
| Total P | 76.5 | 62.5 |
| Ortho P | 62.5 | 56.5 |

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A system for preventing fat, oil, and grease (FOG) accumulation in a grease trap, the system comprising:

- a screening device for placement in a sink basin, the device comprising:
  - a first filter frame including a first plurality of openings,
  - a second filter frame including a second plurality of openings, and
  - a filter removably disposed between the first filter frame and the second filter frame; and
- a system for treating a grease trap, the system comprising:
  - a reservoir defining an inner cavity for containing a composition,
  - a pump having an input port and an output port, wherein the pump is configured to create a pressure difference between the input port and the output port to cause liquid to flow from the input port to the output port, and
  - a grease trap in fluid communication with the sink basin,
  - wherein the inner cavity of the reservoir is in fluid communication with the input port of the pump and the output port of the pump is in fluid communication with the grease trap such that the pump causes the aromatic imine within an inner cavity of the reservoir to flow into the grease trap.

2. The system of claim 1, wherein each opening of the first plurality of openings has a first opening largest dimension, wherein the first opening largest dimension is 40 mm or less, wherein each opening of the second plurality of openings has a second opening largest dimension, wherein the second opening largest dimension is 40 mm or less.

3. The system of claim 2, wherein each opening of the first opening largest dimension and the second opening largest dimension is 35.5 mm or less.

4. The system of claim 2, wherein each opening of the first opening largest dimension and the second opening largest dimension is 25 mm or more.

5. The system of claim 1, wherein the filter has a grams per square meter (GSM) in the range of 25 GSM to 100 GSM.

6. The system of claim 5, wherein the GSM is in the range of 25 GSM to 75 GSM.

7. The system of claim 6, wherein the GSM is in the range of 40 GSM to 60 GSM.

8. The system of claim 1, wherein each opening of the first plurality of openings or each opening of the second plurality of openings is a rectangular-shaped opening.

9. The system of claim 8, wherein each opening of the first plurality of openings or each opening of the second plurality of openings is a square-shaped opening.

10. The system of claim 1, wherein the first filter frame or the second filter frame includes a wire grate, wherein the wires at least partially define the first plurality of openings or the second plurality of openings, respectively.

11. The system of claim 1, wherein the first filter frame or the second filter frame comprises a rust resistant material.

12. The system of claim 11, wherein the first filter frame or the second filter frame comprises stainless steel.

13. The system of claim 1, wherein the first filter frame has a first filter frame length and a first filter frame width, the second filter frame has a second filter frame length and a second filter frame width, and the filter has a filter length and a filter width, wherein the filter length is less than the largest of the first filter frame length and the second filter frame length, wherein the filter width is less than the largest of the first filter frame width and the second filter frame width.

14. The system of claim 1, further comprising a basket having a floor removably disposable on the first filter frame, the floor defining a plurality of basket openings, wherein each of the basket openings have a basket opening largest dimension, wherein the basket opening largest dimension is smaller than the first opening largest dimension and the second opening largest dimension.

15. The system of claim 14, wherein the basket opening largest dimension is in the range of 1.5 mm to 2.5 mm.

16. The system of claim 15, wherein the basket opening largest dimension is about 2 mm.

17. The system of claim 14, wherein each opening of the plurality of basket openings is a circular-shaped opening.

18. The system of claim 14, wherein the basket comprises a rust resistant material.

19. The system of claim 18, wherein the basket comprises stainless steel.

20. The system of claim 14, wherein the basket defines one or more handles.

21. The system of claim 1, wherein the pump comprises a peristaltic pump.

22. The system of claim 1, wherein the pump is configured to cause the composition to flow into the grease trap at a flowrate in the range of 20-140 ml/min.

23. The system of claim 22, wherein the flowrate is about 75-85 ml/min.

24. The system of claim 1, wherein the inner cavity of the reservoir has a capacity of 1 liter or more.

25. The system of claim 1, wherein the inner cavity contains the composition, the composition comprising the aromatic imine.

26. The system of claim 25, wherein the composition further contains a surfactant.

27. The system of claim 26, wherein the composition further contains water.

28. The system of claim 27, wherein the composition contains:

- from about 25% by weight to about 85% by weight of the aromatic imine;
- from about 5% by weight to about 25% by weight of the surfactant; and
- from about 10% by weight to about 50% by weight of the water.

29. The system of claim 28, wherein the composition contains:

from about 50% by weight to about 70% by weight of the aromatic imine;

from about 5% by weight to about 15% by weight of the surfactant; and from about 20% by weight to about 40% by weight of the water.

30. The system of claim 29, wherein the composition contains:

about 60% by weight of the aromatic imine;

about 9% by weight of the surfactant; and about 31% by weight of the water.

31. The system of claim 26, wherein the surfactant is a member selected from the group consisting of amine oxides, lauryl sulfates, laureth sulfates, olefin sulfonates, sulfosuccinates, amphoacetates, sultaines, phosphonates, alkyl betaines, betaines, phosphate esters, sulfonated copolymers, xylene sulfonate salts, enhanced polymaleic salts, salts of acrylic acids, polyaspartic acid salts and sodium or potassium salts of fatty acids, amides, polyethylene glycols, polyglucosides, sorbitan derivatives, ethoxylated alcohols, and combinations thereof.

32. The system of claim 25, wherein the aromatic imine comprises an aromatic amine formed from one or more combinations of one or more aromatic aldehydes and ketones with primary and tertiary amines.

33. The system of claim 32, wherein the one or more aromatic aldehydes is a member selected from the group consisting of benzaldehyde, cinnamaldehyde, a vanillin, and combinations thereof.

34. The system of claim 32, wherein the one or more amines is a member selected from the group consisting of ethanolamine, benzylamine, methyl diethanolamine, diglycolamine, and combinations thereof.

35. The system of claim 1, wherein the pump is configured to cause to flow a shock dose of composition into the grease trap, wherein the shock dose about 0.25% to about 1.5% volume of composition per volume capacity or volume of material in the grease trap being treated.

36. The system of claim 1, wherein the pump is configured to cause to flow a maintenance dose of composition into the grease trap, wherein the maintenance dose contains about 0.0025% to about 0.01% volume of composition per volume capacity or volume of material in the grease trap being treated.

37. The system of claim 1, wherein the composition further comprises an alkaline buffer.

* * * * *